United States Patent

[11] 3,536,059

| [72] | Inventors | Peter J. Hearst<br>673 Devonshire Drive,<br>Oxnard, Calif. 93030, and<br>William B. Plum, 611 Colina Vista,<br>Ventura, California 93003 |
|---|---|---|
| [21] | Appl. No. | 772,608 |
| [22] | Filed | Nov. 1, 1968 |
| [45] | Patented | Oct. 27, 1970 |

[54] CHEMICAL HEAT SOURCE FOR DIVERS
7 Claims, 3 Drawing Figs.

| [52] | U.S. Cl. | 126/204, 126/400 |
|---|---|---|
| [51] | Int. Cl. | A61f 7/06, F24j 3/00 |
| [50] | Field of Search | 126/204, 263, 400; 165/46 |

[56] References Cited
UNITED STATES PATENTS

| 2,936,741 | 5/1960 | Telkes | 126/400X |
|---|---|---|---|
| 3,161,192 | 12/1964 | McCormack | 126/204 |
| 3,182,653 | 5/1965 | Mavleos et al. | 126/204 |
| 3,400,249 | 9/1968 | Mekjean et al. | 126/400X |
| 3,450,127 | 6/1969 | Harwood | 126/204 |

*Primary Examiner*—Charles J. Myhre
*Attorneys*—Q. Baxter Warner, Edgar J. Brower and Gayward N. Mann ABSTRACT: An external chemical heat means for supplying warm water to a diving suit. It includes a sealed container of an appropriate heat-storing chemical and utilizes the chemical heat of crystallization to warm water circulated through heat exchange tubes. This warm water is then mixed with cool water in suitable proportions so that water flowing into the suit is maintained at a selected temperature.

Patented Oct. 27, 1970

3,536,059

INVENTORS
PETER J. HEARST
WILLIAM B. PLUM
BY
*Gayward N. Mann*
*Q. Baxter Warner*
ATTORNEYS 3,536,059

CHEMICAL HEAT SOURCE FOR DIVERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to chemical means for heating underwater personnel and equipment and to thermostatic means for controlling the degree of heat obtained.

2. Description of the Prior Art

It has long been recognized that a need exists for a compact portable heat source. Such a heat source would find wide application in cold or submerged environments. For example, a practical portable heat source would find great use by divers, arctic explorers, aviators downed in the ocean and the like. Although the prior art is replete with such heating devices many have not been used to any great extent due to their unreliability, unwieldiness and inefficiency. Simple insulated protective suiting has heretofore been the most successful means of conserving body heat in cold environments but some source of heat is a necessity if humans are to endure underwater cold for any extended length of time.

An isotopic heat source contained in a back pack is under development. This prior art back pack contains a circulating pump which transfers water as a heat exchange liquid through the heat source and through the suiting of the diver. A great disadvantage is the high cost of the isotopic power source, the danger of exposure to radiation, and the inability to control the amount of heat produced. What is needed is an inexpensive heat source from which heat can be supplied at the rate needed.

SUMMARY OF THE INVENTION

The present invention involves a novel manner of warming water flowing within a simple heat exchange device by utilizing the heat of crystallizations created during the transition of a chemical from a liquid to a solid state. The water heated by such device is mixed with water circulating in a protective garment such as a diver's wet suit so that the temperature of the protective garment is maintained within a preselected range. The heat exchange device is worn as a portable back pack and is interchangeable with other similar devices so as to provide protection for an unlimited period of time.

STATEMENT OF THE OBJECTS

An object of the present invention is to provide a simple heat exchange device for heating water distributed to a protective suit.

Another object is to provide a portable heat exchange device utilizing the heat created during the transition of a chemical from a liquid to a solid state.

Another object is to provide a reliable, economical and easily operated heat exchange device.

Other objects, advantages, and novel features of the invention will become apparent from the following detailed description of the invention when considered in conjunction with the accompanying drawings.

DESCRIPTION OF THE PREFERRED EMBODIMENT

Figure 3:
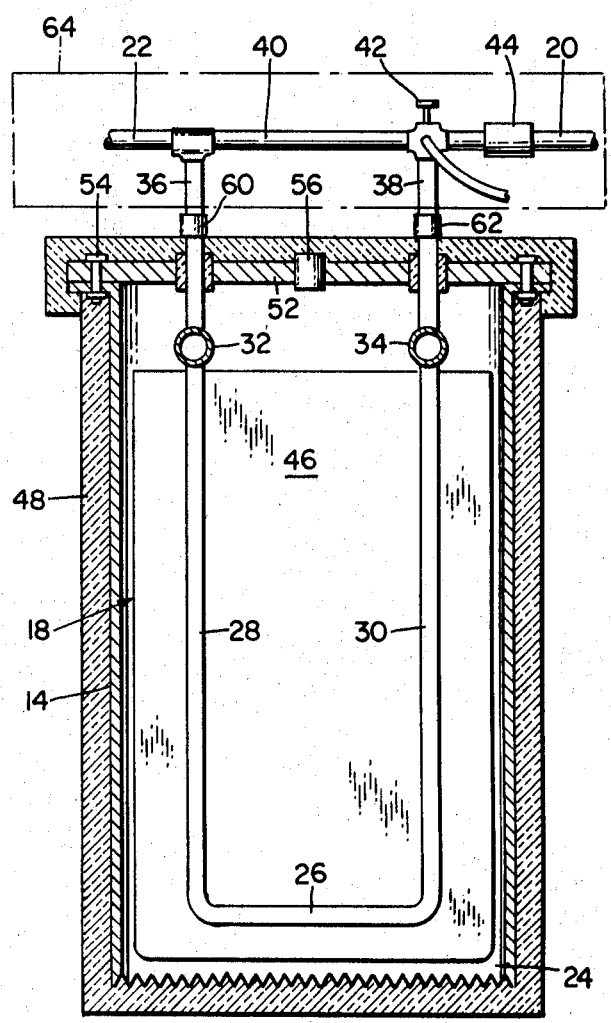
FIG. 3 is a sectional view taken along the line 3–3 of FIG. 2.
Figure 2:
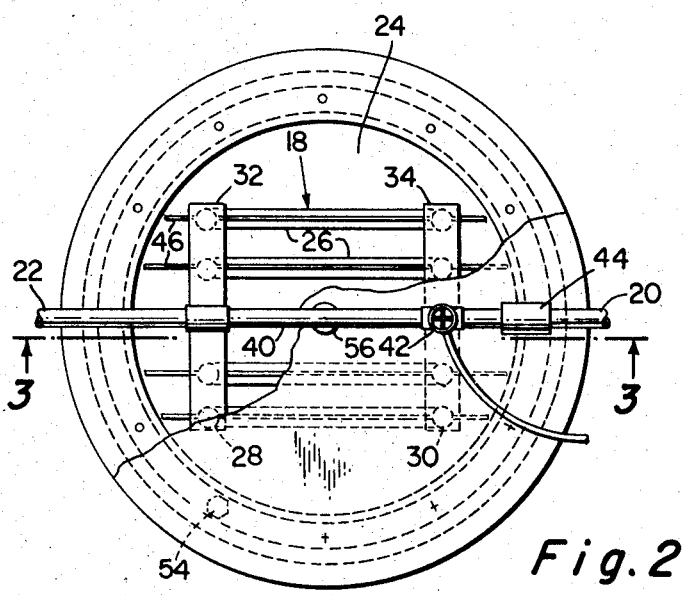
FIG. 2 is a top plan view of the heat exchange unit.

Referring now to the drawings in detail there is shown an individual 10 wearing a conventional protective wet suit 12 with a container 14 forming part of a standard skin diver's back pack 15. It may be attached to the individual by the straps 16. A heat exchange unit 18 (FIGS. 2, 3) positioned within the container 14 provides warm water which may be carried by an outlet duct 20 to the wet suit 12 where it may be circulated through a series of tubes (not illustrated) within the wet suit 12 and eventually returned to the heat exchange unit 18 by inlet duct 22.

The heat exchange unit 18 mentioned previously is enclosed within a leakproof container 14 which is filled with a suitable chemical 24 selected primarily for its heat of crystallization characteristics, said heat of crystallization being released during freezing of the chemical 24.

A cover 52 is positioned over the container 14 and is hermetically sealed against leakage by any suitable means 54. A fill plug 56 may be located in the cover to permit filling the container with chemical material 24.

The heat exchange unit 18 is of the shell and tube type and includes a series of U-shaped heat exchange tubes 26 having each arm 28 and 30 thereof connected to a pair of parallel manifolds 32 and 34 respectively, while a pair of upright ducts 36 and 38 join the manifolds 32 and 34 to a bypass duct 40 and to an adjustable automatic mixing valve 42, which automatically maintains a selected temperature of the water flowing into the suit 12. As shown, the arrangement is such that valve 42 may cause part of the circulating water to pass into duct 36 thence into inlet manifold 32 and finally into the descending arms 28 of heat exchange tubes 26 where the water therein is warmed by the heat of crystallization of the molten chemical material 24 as it freezes within container 14. The warmed water then passes out of tubes 26 through ascending arms 30 whereupon it is collected in outlet manifold 34. Thereafter the warmed water is discharged through duct 38 and thermal valve 42 where it mixes with the water from the bypass duct 40 and is delivered by a pump 44 to the suit 12.

To assure maximum heat transfer from the chemical 24, each heat exchange tube 26 is incorporated in a large area heat conductive plate 46. Of course many more plates may be used in order to provide the optimum heat transfer area. Alternatively, instead of the plate, tube and manifold arrangement shown, a continuous coiled tube may be used as a heat exchanger. Furthermore, if desired, the ducts 36 and 38 may be incorporated in a suitable separate heat exchange device to reduce the temperature of the fluid entering valve 42.

The container 14 may be of any desired overall shape or configuration. It should be constructed or manufactured from materials which will not corrode or be damaged by the chemicals employed or by contraction or expansion of the chemical substance during change of state. To aid in accommodating such changes in volume of the chemical the bottom of the container may be corrugated as shown. Suitable insulation 48 should be positioned around container 14 to retain the heat produced therein. It may prove desirable to use a vacuum jacket to provide the desired insulation. Suitable insulation 64 should also be placed around the manifold, thermal control valve, pump, and supply lines to prevent undue heat losses.

Figure 1:
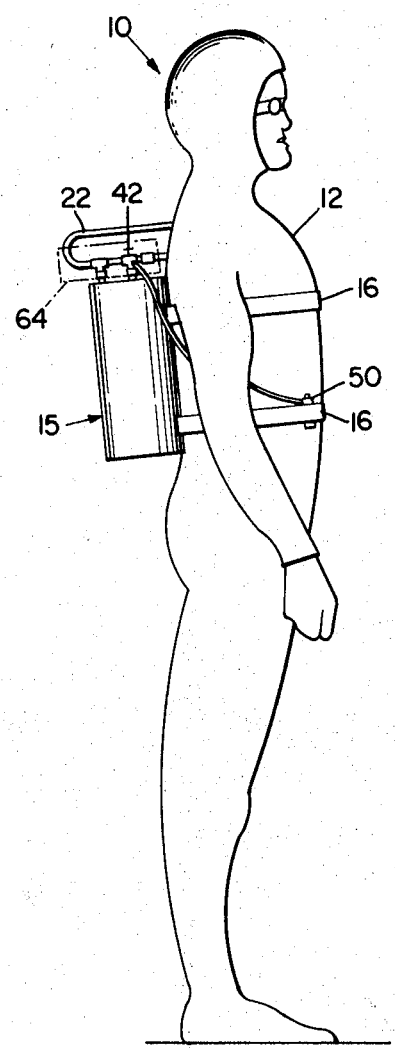
FIG. 1 is a side elevational view of one embodiment of the device as applied to the protective suit of a diver.

The thermal control valve 42 is preferably adjustable by the individual through a remote control switch 50 (FIG. 1) so that he may select a desired temperature of water coming into his wet suit.

After the chemical in the heat source has crystallized and given up its heat of crystallization it will have to be regenerated. This is accomplished by heating the chemical above its melting point and thus storing heat as heat of fusion. This heat will then be available from the heat source as heat of crystallization, and this process can be repeated indefinitely. The regeneration may be accomplished by removing the container 14 at the quick disconnects 60 and 62 and passing steam through the heat exchanger 18. Alternatively, an electric heater and thermostatic control switch may be made part of or inserted in the container 14 and the chemical 24 through opening 56 or otherwise. If an electrical heater is used, the container need not be removed from the back pack for regeneration.

The chemical heat source may have a crystallization point at any convenient temperature above the highest temperature desired for the circulating water. As an example the water supplied to the wet suit should be below 45°C. (113°F.) and the desirable temperature might be 41°C. (106°F.) while the water returning from the wet suit might be 36°C. (97°F.). The thermal control valve 42 is set to mix a small amount of water from the heat exchange unit 18 (which is at a temperature considerably above 45°C.) with water flowing through line 40 to provide water at the desired temperature to the wet suit 12.

A number of chemicals are satisfactory for utilization as the chemical heat source. Desirable properties which the chemical should have include: (1) easy crystallization, either of its own accord or in the presence of appropriate seed materials; (2) a melting point considerably above body temperature, and preferably above 45°C. (113°F.); (3) a high heat of crystallization so that the maximum amount of heat can be produced by a given unit volume of available space; (4) a density not so high so as to make portability difficult; and (5) no tendency to be corrosive or reactive with container 14.

The following tables set forth examples of chemicals and chemical mixtures satisfactory for use as the chemical heat source in the present invention employed in conjunction with a diver's protective wet suit. Table I lists the melting point and the kilocalories of heat of crystallization of 5 liters of each chemical. Five liters of the chemical were chosen since this quantity is readily accommodated in the insulated container 14.

TABLE I

| Chemical | Melting Point °C. | °F. | Heat of Crystallization (Kilocalories per five liters) |
|---|---|---|---|
| p-Dichlorobenzene | 52 | 126 | 217 |
| Nickel nitrate (hydrated) | 56 | 134 | 375 |
| Stearic acid | 64 | 145 | 202 |
| Bromocamphor | 77 | 170 | 302 |
| Napthalene | 80 | 176 | 204 |
| Magnesium nitrate (hydrated) | 90 | 194 | 314 |

All of these chemicals would supply the approximately 125 to 250 kilocalories needed by an inactive diver for a period of 1 hour and would very likely supply said diver's requirements for an appreciably longer period if the diver were active and reduced his heat requirements.

Instead of individual salts or organic compounds, as shown above, chemical mixtures and in particular eutectic mixtures may be employed. Examples of such mixtures are shown in Table II.

TABLE II

| Chemical Mixture | Melting Point °C. | °F. |
|---|---|---|
| Binary eutectic mixtures: | | |
| Potassium nitrate—lithium nitrate | 125 | 257 |
| Potassium hydrogen suflate—sodium hydrogen sulfate | 125 | 257 |
| Sodium nitrate—magnesium nitrate | 136 | 277 |
| Sodium nitrate—lithium nitrate | 206 | 403 |
| Ternary Systems: | | |
| Potassium nitrate—lithium nitrate—calcium nitrate | 117 | 243 |
| Potassium nitrate—lithium nitrate—sodium nitrate | 120 | 248 |
| Sodium nitrate—lithium nitrate—cadmium nitrate | 125 | 257 |
| Sodium nitrate—potassium nitrate—magnesium nitrate | 128 | 262 |

It is obvious that these examples cited consist for the most part of the alkali nitrates, lithium, sodium, and potassium nitrate and of the alkaline earth nitrates, magnesium and calcium nitrate.

Thus, the chief requirements of an external, portable chemical heat source for divers are simplicity in operation and safety from possible overheating of the diver. Furthermore an adequate supply of regenerated heat source containers 14 or complete back packs 15 will insure that no time limitations for exposure are imposed on the system.

It should be clear that while the invention has been described in relation to a diver's wet suit, it may be used with any other protective equipment and in cold environments other than the ocean.

Obviously many modifications and variations of the present invention are possible in the light of the above teachings. It is therefore to be understood that within the scope of the appended claims the invention may be practiced otherwise than as specifically described.

We claim:

1. A portable heat source employed in conjunction with a protective garment to be used in an aqueous environment and adapted to supply a heated fluid through ductways in such protective garment in order to warm the same comprising in combination:
   a container;
   a series of interconnected tubes positioned in the container and designed to carry a heat transfer fluid therein;
   a nonhazardous chemical substance having a melting point above 45°C. sealed within said container and placed adjacent the interconnected tubes, said chemical substance capable of supplying heat of crystallization at a constant temperature during solidification thereof, such heat of crystallization adapted to warm the heat transfer fluid within the interconnected tubes;
   a first duct designed to carry heated fluid from the heat source to the ductways in said protective garment;
   a second duct designed to return said fluid from said ductways to the heat source;
   a bypass duct positioned within the container connecting both the first and second ducts;
   a thermal valve positioned in said bypass duct and adapted to control the quantity of heated fluid entering the garment ductways thus maintaining a suitable temperature in said protective garment; and
   means to pump said heated fluid from the heat source through the ductways within the protective garment.

2. The portable heat source as defined in claim 1 wherein said chemical is selected from the group consisting of p-dichlorobenzene, stearic acid, bromocamphor, naphthalene, hydrated nickel nitrate and magnesium nitrate.

3. The portable heat source as defined in claim 1 wherein said chemical is a mixture of alkali nitrates.

4. The portable heat source as defined in claim 1 wherein said chemical is a mixture of alkali nitrates and alkaline earth nitrates.

5. The portable heat source as defined in claim 1 wherein said chemical substance is a mixture of chemicals selected from the group consisting of potassium nitrate—lithium nitrate; potassium hydrogen sulfate—sodium hydrogen sulfate; sodium nitrate—magnesium nitrate; sodium nitrate—lithium nitrate; potassium nitrate—lithium nitrate—calcium nitrate; potassium nitrate—lithium nitrate—sodium nitrate; sodium nitrate—lithium nitrate—cadmium nitrate; sodium nitrate—potassium nitrate—magnesium nitrate.

6. The portable heat source as defined in claim 1 wherein a manually operated temperature control valve is positioned within said heat exchange means and adapted to allow controlled temperature variations in the protective garment by allowing suitable amounts of hot fluid to be pumped into the protective garment from the heat exchange means.

7. The portable heat source as defined in claim 1 wherein said fluid is water.